Nov. 24, 1942.  H. F. MALONE  2,303,217
INDICATOR
Filed Dec. 12, 1938    4 Sheets-Sheet 1

Inventor:
Homer F. Malone
By Williams, Bradbury,
McCaleb & Hinkle
Attys.

Nov. 24, 1942.　　　H. F. MALONE　　　2,303,217
INDICATOR
Filed Dec. 12, 1938　　4 Sheets-Sheet 2
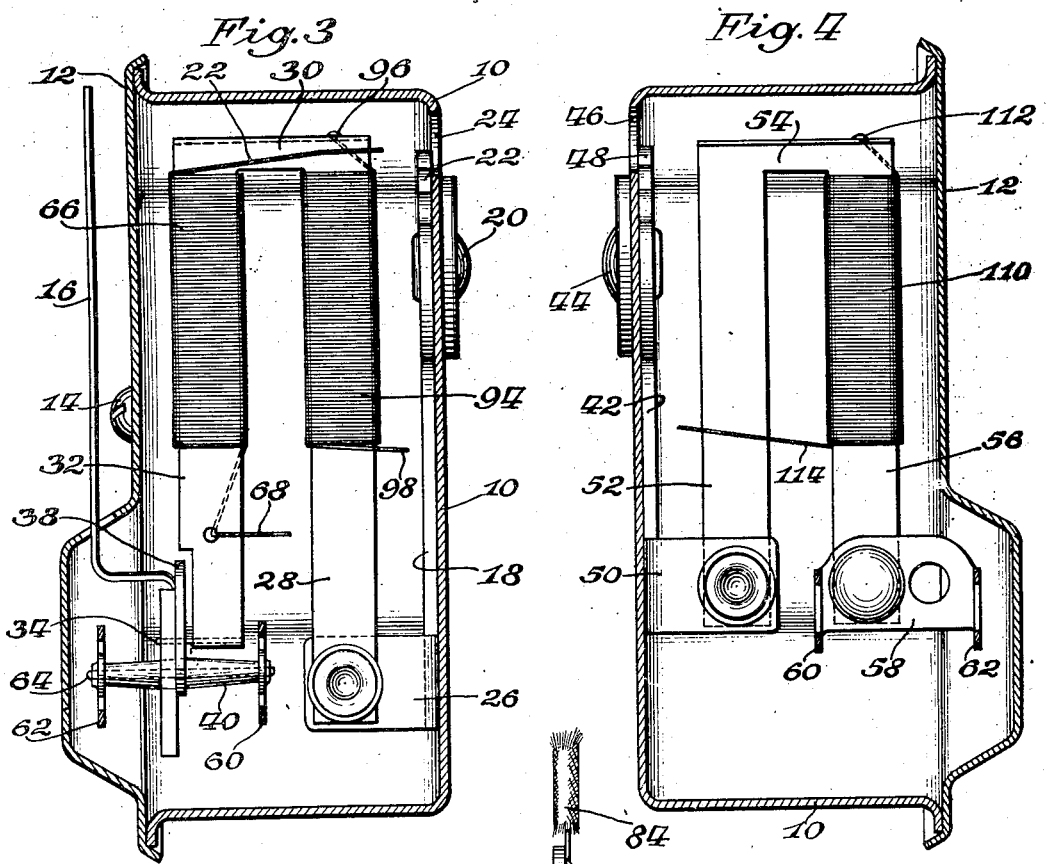
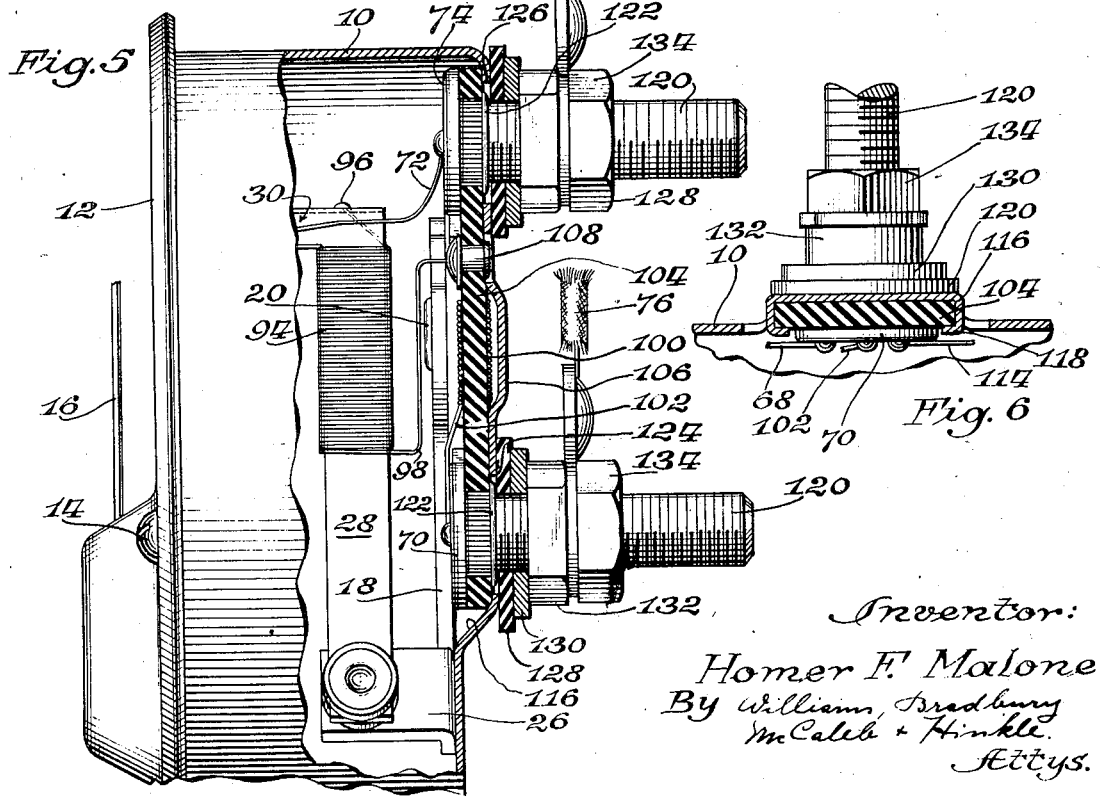
Inventor:
Homer F. Malone
By Williams, Bradbury, McCaleb & Hinkle
Attys.

Nov. 24, 1942.   H. F. MALONE   2,303,217
INDICATOR
Filed Dec. 12, 1938   4 Sheets—Sheet 3

Inventor:
Homer F. Malone
By Williams, Bradbury,
McCaleb & Hinkle
Attys.

Nov. 24, 1942.     H. F. MALONE     2,303,217
INDICATOR
Filed Dec. 12, 1938     4 Sheets-Sheet 4

Inventor:
Homer F. Malone
By Williams, Bradbury, McCaleb & Hinkle
Attys.

Patented Nov. 24, 1942

2,303,217

UNITED STATES PATENT OFFICE 2,303,217

INDICATOR

Homer F. Malone, Chicago, Ill., assignor to Stewart-Warner Corporation, Chicago, Ill., a corporation of Virginia Application December 12, 1938, Serial No. 245,077

15 Claims. (Cl. 171—95)

My invention relates to indicators and is more particularly concerned with the provision of an electrical indicator especially designed for use on automotive vehicles to indicate the quantity of gasoline in the main gasoline tank, the engine temperature, the pressure existing in the engine oiling system, the voltage of the electrical system, and similar items of interest to the driver of the automobile. The indicator disclosed herein is an improvement over that disclosed and claimed in my prior application, Serial No. 151,296, filed June 30, 1937.

An object of my present invention is to provide an improved indicator which is more reliable than any heretofore known.

Another object of my invention is to provide an improved indicator which may be more easily assembled than the indicators heretofore known.

Another object of my invention is to provide an improved indicator which is less expensive than the indicators heretofore known.

Another object of my invention is to provide an improved indicator wherein the various parts of the indicator are subjected to less stress and strain than the parts of prior indicators.

Another object of my invention is to provide an improved indicator which is free from rattling.

Another object of my invention is to provide an indicator having an improved drive for the indicating needle.

Another object of my invention is to provide an indicator having an improved arrangement of the mechanism for compensating for changes in ambient temperature.

Another object of my invention is to provide an indicator having improved mechanism for compensating for variations in circuit voltage.

Another object of my invention is to provide an indicator having an improved mounting for the pointer shaft.

Other objects and advantages will become apparent as the description proceeds.

In the drawings:

Figure 3 is a sectional view taken on the line 3—3 of Figure 2.

Figure 4 is a sectional view taken on the line 4—4 of Figure 2.

Figure 5 is a partial section taken on the line 5—5 of Figure 2.

Figure 6 is a partial sectional view taken on the line 6—6 of Figure 2.

Referring to Figures 1 to 8 inclusive, I have illustrated this embodiment of my invention as comprising a cup 10 of sheet metal or other suitable material having a cover or dial 12 removably secured thereto by screws 14. The dial, as clearly indicated in Figure 1, bears suitable indicia for cooperating with the pointer 16 to indicate the desired measurement.

Figure 2:
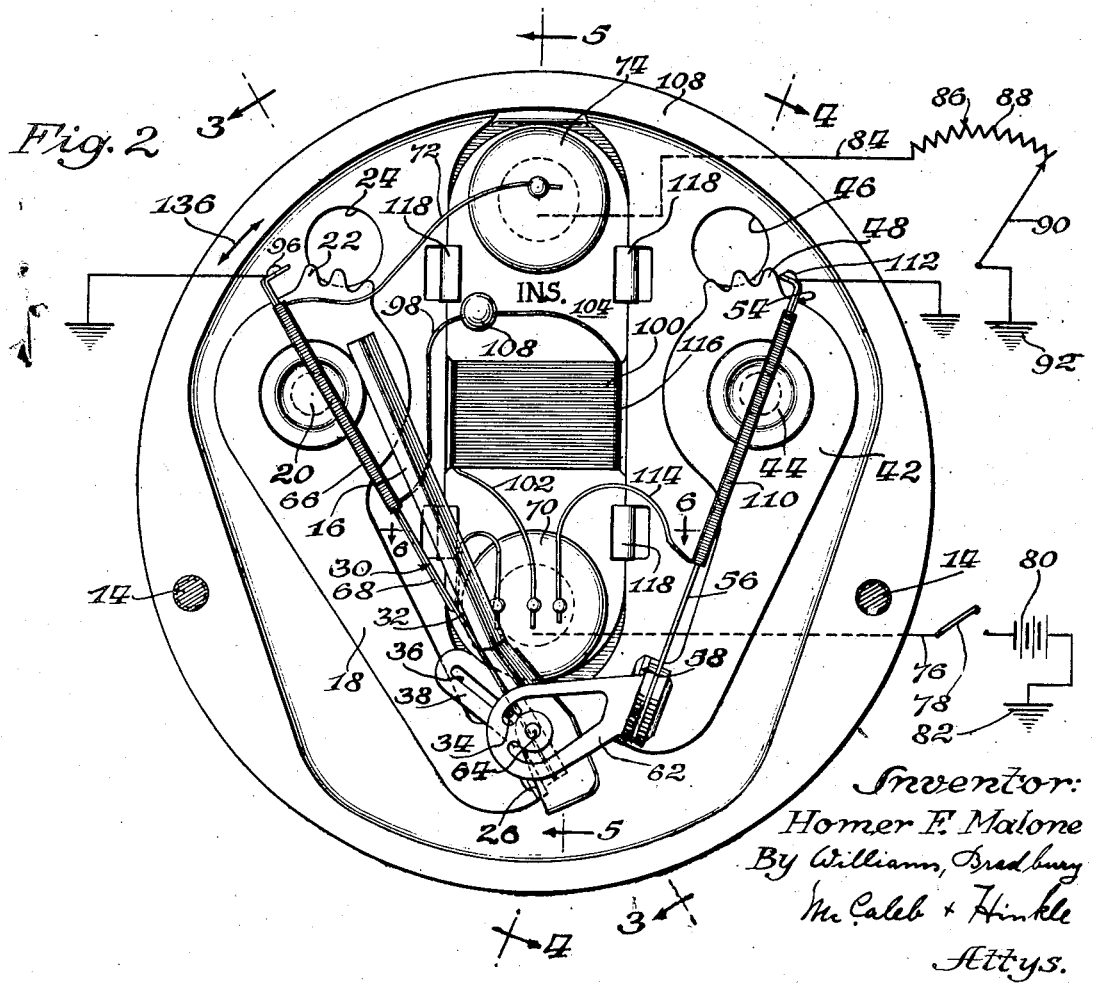
Figure 2 is an enlarged sectional view taken on a plane parallel to and just behind the indicator dial. This figure diagrammatically shows the electrical connections of a typical circuit in which my improved indicator is adapted to be used.

A bracket 18 is attached to the cup 10 by rivet 20 or other suitable means. The upper end of the bracket 18 as shown in Figure 2 is provided with teeth 22 adapted to be engaged by a tool inserted through an opening 24 to pivotally adjust the bracket 18 about the rivet 20 and thereby regulate the calibration of the instrument. It will be understood that the rivet 20 clamps the bracket 18 against the cup 10 and frictionally holds the bracket 18 in adjusted position.

The free end of the bracket 18 is provided with an upstanding flange 26 on which is mounted the leg 28 of a U-shaped temperature responsive bi-metallic element 30. The other leg 32 of the temperature responsive element 30 carries a pin 34 located in the slot 36 of an arm 38 attached to the tubular pointer shaft 40 (Figure 3).

A second bracket 42 is attached to the cup 10 by rivet 44 and may be pivotally adjusted about this rivet by inserting a tool through the opening 46 to engage the teeth 48 provided on the bracket 42. The free end of the bracket 42 has a flange 50 attached to the leg 52 of a second U-shaped temperature responsive bi-metallic element 54. The other leg 56 of the U-shaped element 54 carries a U-shaped bearing member 58 having arms 60 and 62 connected by a pin 64 which forms a pivotal support for the tubular pointer shaft 40.

An actuator coil 66 surrounds the leg 32 of the bimetallic element 30 and has a lead 68 connected to the ignition terminal 70 and a second lead 72 running to the sending unit terminal 74. The ignition terminal 70 is connected to the usual automobile ignition system by a wire 76 connecting the ignition terminal 70 with the usual automobile ignition switch 78 which in turn is connected to the automobile battery 80 which is illustrated as being grounded to the automobile frame at 82. The sending unit terminal 74 is connected by wire 84 with a sending unit 86 which may be of any conventional type, but which is preferably of the kind disclosed in my prior application, Serial No. 151,297, filed June 30, 1937. As illustrated in the drawings of the present application, this sending unit is in the form of a rheostat having a resistance 88 and a slider 90 which is grounded at 92.

Figure 1:
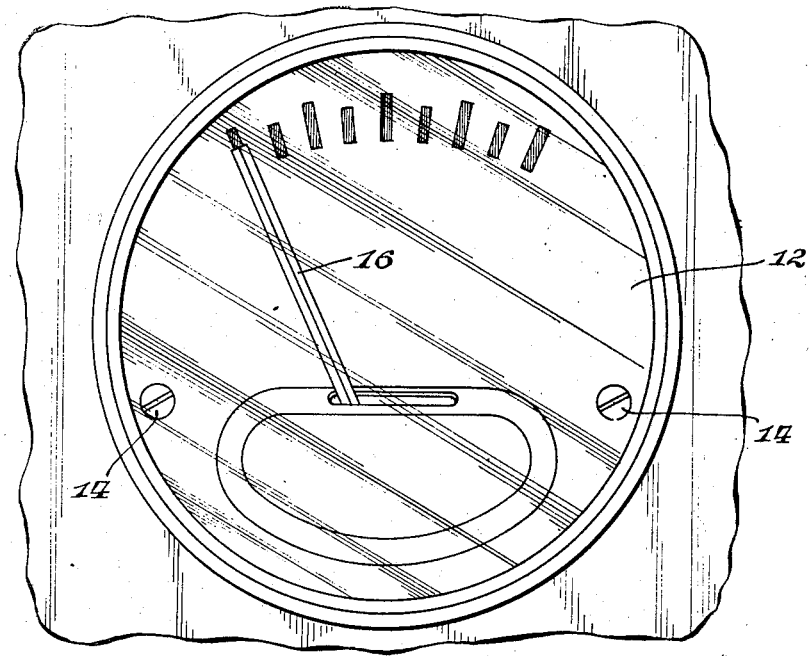
Figure 1 is a front elevation of an indicator embodying my invention showing it mounted on a support such as the instrument panel of an automobile.

In the drawings, the sending unit is illustrated as being in the position which it assumes when the pointer 16 is at the lowermost end of its scale, as indicated in Figure 1. It will be understood that the slider 90 may be actuated by a float responsive to the quantity of gasoline in the fuel tank of the automobile or by a temperature responsive element for indicating the automobile engine temperature or by any other element responsive to variations in any condition which it is desired to indicate.

In order to simplify the calibration of the indicator, I provide the leg 28 of the bi-metallic element 30 with a balance coil 94 grounded at 96 to the element 30 and connected by a lead 98 to one end of a resistance coil 100. The other end of this resistance coil is connected by wire 102 to the ignition terminal 70.

Referring particularly to Figures 2 and 5, it will be noted that the coil 100 is supported on a strip 104 of insulating material and that the base of the cup 10 is bulged outwardly as indicated at 106 so that it is spaced from this coil. Electrical communication between the end of the lead 98 and the end of the coil 100 is effected by soldering both of these ends to a rivet 108 which extends through the insulating strip 104 but does not contact with the metal cup 10.

A voltage compensating coil 110 is carried by the leg 56 of bimetallic element 54 and has one end grounded to this element as indicated at 112. The other end of the coil 110 is connected to the ignition terminal 70 by wire 114.

Referring particularly to Figures 2, 5 and 6, it will be noted that the insulating strip 104 is located in a closely fitting recess 116 provided in the base of the metal cup 10 and is secured in place by fingers 118 which are an integral part of the cup 10. The terminal 70 comprises a bolt 120 having an enlarged head to which the wires 68, 102, and 114 are soldered. This enlarged head is located on one side of the insulating strip 104, and a flange 122 of the bolt 120 is located on the other side of the insulating strip 104 to prevent separation of the bolt 120 from the insulating strip and thus form a unitary subassembly. The bolt 120 extends in spaced relation through an opening 124 provided in the base of the cup 10.

The terminal 74 is identical with the terminal 70 and likewise comprises a bolt 120 having a head to which the wire 72 is soldered. The bolt 120 of the terminal 70 also has a flange 122 to secure the bolt in assembled relation to the insulating strip 104. The bolt 120 of the terminal 74 extends in spaced relation through an opening 126 in the metallic cup 10.

In addition to the fingers 118 previously described, the assembly comprising the insulating strip 104 and the bolts 120 is also secured to the cup 10 by insulating washers 128, metal washers 130, and nuts 132. Nuts 134 serve to secure the wires 76 and 84 to their respective terminals.

The legs 28 and 32 of the bimetallic element 30 are made of the same effective length so that changes in atmospheric temperature will produce equal curvatures of both legs, thereby causing the upper end of the element 30 to move in a path indicated by the arrow 136 of Figure 2 but without changing the position of the driving pin 34. Similarly, the legs 52 and 56 of the bi-metallic element 54 have the same free or effective length so that changes in atmospheric temperature will produce equal curvatures of both legs without changing the position of the bearing member 58 and pointer shaft 40 with respect to the support 18.

It is to be understood that the term "atmospheric temperature" used in the preceding paragraph, is to be interpreted broadly enough to include local temperature changes resulting from the close presence of a heat-producing or heat-absorbing mechanism, such, for example, as the internal combustion engine of an automobile which may raise the temperature in its immediate locality several degrees, particularly when the automobile is standing. It is to be further noted that this compensation for atmospheric or ambient temperature changes is accomplished without producing any stress or strain in the mechanism of the indicator and more particularly without imposing any additional load upon the bearings of the pointer 16.

Figure 8:
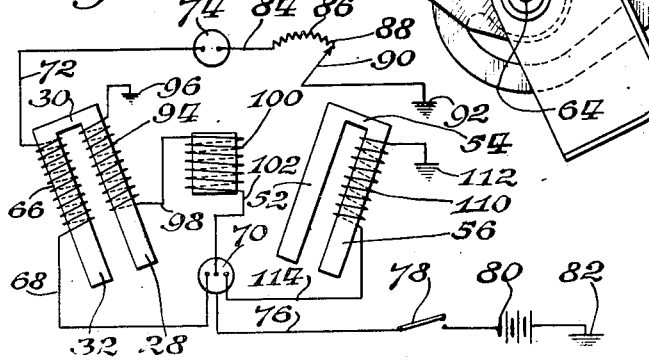
Figure 8 is a diagrammatic view showing the electrical connections.

In Figures 2 and 8 I have indicated the position of the slider 90 which corresponds to the zero position of the pointer 16 illustrated in Figure 1. In this position of the slider 90, the full value of the rheostat resistance 88 is in series with the actuator coil 66. This full value of the resistance 88 is equal to the resistance of the coil 100 in series with the balance coil 94. Upon closing the ignition switch 78, the same current therefore flows through the coils 66 and 94, thus heating the bi-metallic legs 32 and 28 to the same temperature and increasing the curvature of these legs without changing the position of the driving pin 34. In this position of the slider 90, the coils 66 and 94 will balance each other perfectly for all variations in voltage of the ignition circuit of the automobile, so that such voltage variations will have no effect whatsoever upon the position of the driving pin 34.

When the ignition switch 78 is closed, a current also flows through the coil 110 surrounding the leg 56 of the U-shaped bi-metallic element 54. The companion leg 52 of this element 54 is not provided with a heating coil so that the flow of current in the coil 110 will cause a shifting of the pointer assembly comprising the bearing member 58, pointer shaft 40, and arm 38, with respect to the support 42 and driving pin 34. This movement, however, produces no change in relationship between the upper end of the pointer shaft 16 and the indicating scale, since such movement merely causes a relative shift between the driving pin 34 and arm 38 lengthwise of the slot 36, so that no rotating movement of the pointer shaft 40 is effected.

When the slider 90 is shifted to reduce the effective value of the resistance 88, a greater current flows through the actuating coil 66 than through the balance coil 94. The greater heat produced by the actuating coil 66 causes a greater curvature of the leg 32 than is given to the leg 28 by the lesser heat produced by the balance coil 94. This greater curvature of the leg 32 shifts the driving pin 34 toward the right as viewed in Figures 2 and 7, thereby rotating the pointer shaft 40 and pointer 16 so that the upper end of this pointer moves to the right as viewed in Figure 1, and indicates a quantity of gasoline corresponding to the movement of the slider 90 under the influence of the gasoline float.

Any variation of the voltage of the electrical system while the pointer is in such an advanced position will produce corresponding variations in the currents flowing through the actuator coil 66 and the balance coil 94. The heat given off by these coils, however, varies with the square of the current flowing therethrough so that the heating effects of these coils will not maintain their same relative values for such changes in voltage. The purpose of the compensating coil 110 is to neutralize the effect of such voltage changes on the indicator when the pointer is in any position other than the zero position.

As I have just pointed out, any deviation from the normal voltage of the electrical system when the pointer 16 is in any position in advance of the zero position, will cause a shifting of the driving pin 34 such that the position of this driving pin no longer accurately responds to the position of the slider 90. This same voltage variation, however, will be impressed upon the compensating coil 110 which will produce a corresponding shift of the bearing member 58, pointer shaft 40 and arm 38, so that such voltage variation does not shift the position of the upper end of the pointer 16 with respect to the indicia on the dial. For example, if the voltage variation is such that the driving pin 34 be given an additional movement to the right, as viewed in Figures 2 and 7 by a deviation in the voltage of the electrical system from the normal voltage, this same voltage deviation, acting through compensating coil 110 upon leg 56, will produce a corresponding shifting to the right of the pointer shaft 40 and arm 38, so that this voltage deviation has no effect whatsoever upon the reading of the indicator.

Voltage variation in the electrical system has no effect on the position of the driving pin 34 when the pointer is at the zero position and the effect of voltage variation on the position of the driving pin 34 increases as the pointer moves farther from the zero position. The compensating effect of the coil 110 likewise correspondingly increases with advancement of the pointer.

Figure 9:
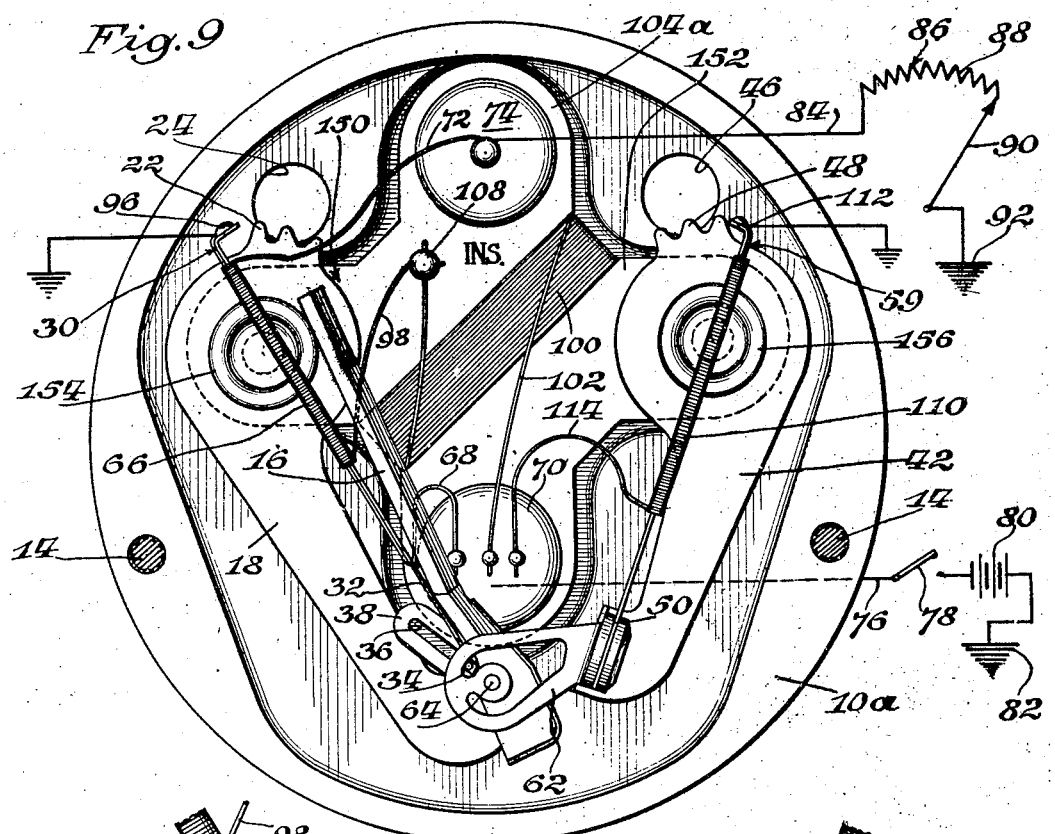
Figure 9 is a view similar to Figure 2 but showing a modified form of my invention.
Figure 7:
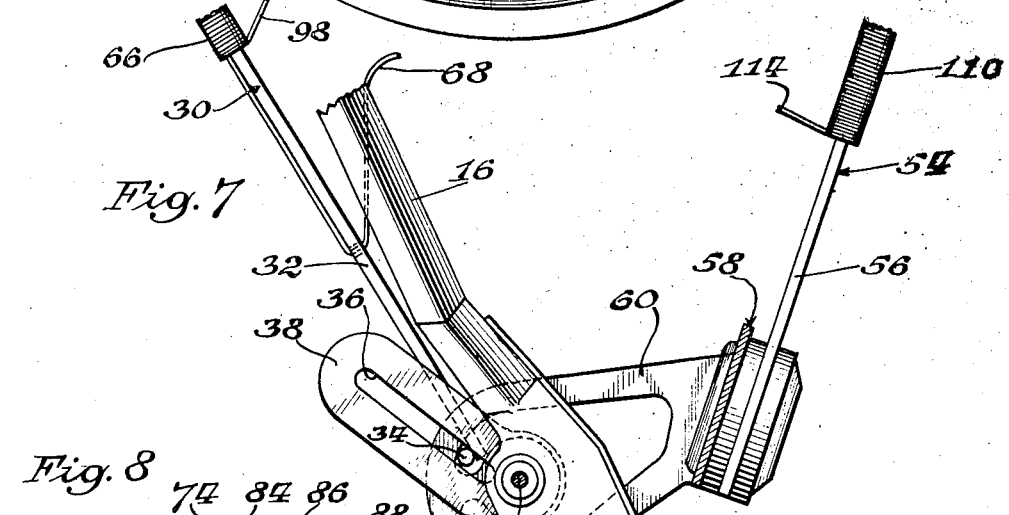
Figure 7 is an enlarged view showing the pointer shaft mounting and driving mechanism.

In Figure 9, I have shown a modified form of my invention. This modified form is identical in operation with the form previously described, but is more advantageous from a manufacturing standpoint, in that it is easier to assemble.

In the embodiment of Figure 9, the supports 18 and 42 are mounted upon the laterally extending arms 150 and 152 of the cross-shaped insulating member 104a which is used in lieu of the insulating strip 104 of the previous embodiment.

In manufacture, the entire operating mechanism can be assembled on the insulating member 104a before this insulating member is inserted in the cup 10a. This makes it possible to solder all of the electrical connections before the parts are inserted in the cup 10a and thus while the electrical connections are more readily available for this operation. During this operation the supports 18 and 42 are secured to the insulating member 104a by the frictional engagement of the small ends of the rivets 154 and 156 and the insulating member 104a.

It will be noted that the cup 10a has a cross-shaped depression for receiving the insulating member 104a and the operating mechanism assembled thereon. Suitable holes are provided in the bottom of the cup 10a for the small ends of the rivets 154 and 156 to pass therethrough and thereafter these ends are expanded or riveted over on the outside of the cup 10a, thus securing the parts in assembled position and forming a ground connection between the supports 18 and 42 and the cup 10a.

Figure 10:
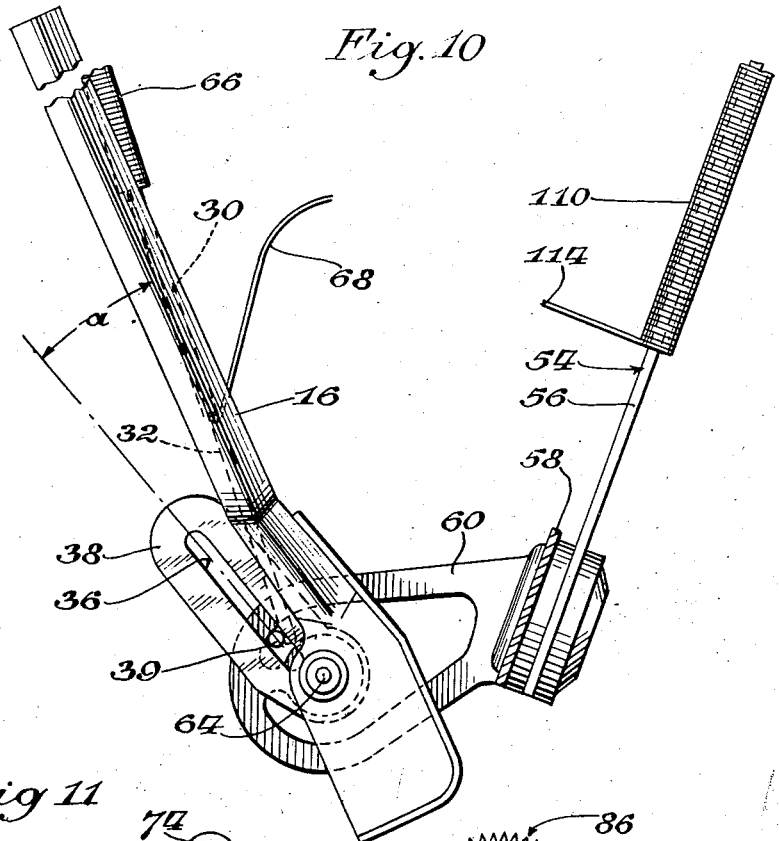
Figure 10 is a view similar to Figure 7 but showing a further modification.
Figure 11:
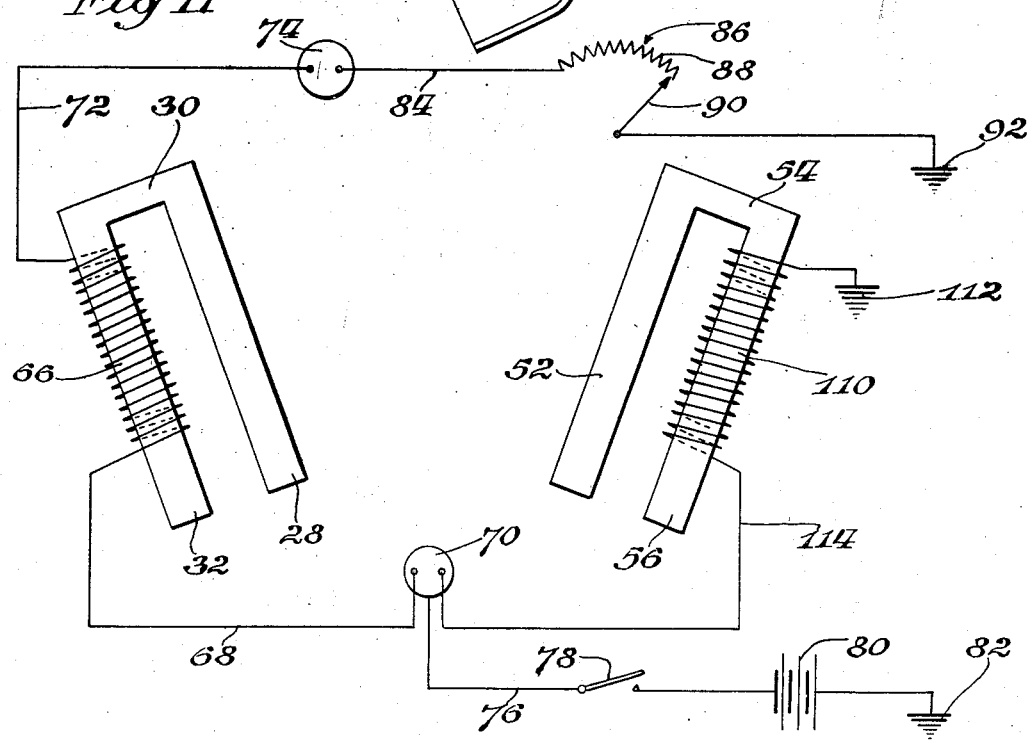
Figure 11 is a diagrammatic view showing the electrical connections of the modification of Figure 10.

In Figures 10 and 11 I have illustrated a simplified form of my invention. The form shown in Figures 10 and 11 may be identical with either of the embodiments previously disclosed except that the coils 94 and 100 have been eliminated and the angle $a$ between the slot 36 and the pointer shaft 16 has been made smaller.

The elimination of coils 94 and 100 means that the pin 34 no longer has the same position for all voltage variations as long as the rheostat slider 90 is in the zero positions indicated in Figures 8 and 11. Instead, the pin 34 has one position when no current is passing through the coil 66 and a different position for each value of current passing through this coil regardless of whether this current variation results from voltage variation or from a shifting of the slider 90. I shall now describe the manner in which I have compensated for current variations in the coil 66 due to variations in voltage of the electrical circuit of which this coil forms a part.

The coil 110 is connected in parallel with the coil 66 and rheostat 86 and thus is affected by the same voltage variations in the electrical circuit. The action of this coil 110 on element 54 thus causes the bearing member 58, pointer shaft 40, and arm 38 to move in accordance with such voltage variations and by reducing the angle $a$ between the pointer shaft 16 and the slot 36 I have found it possible to compensate perfectly for positional changes of the pin 34 resulting from voltage variation in the electrical circuit. This compensation for voltage variation is effective throughout the entire operating range of the slider 90.

My invention is not limited to the particular forms illustrated and described, but may assume numerous other forms. The scope of my invention is defined by the following claims.

I claim:

1. In a device of the class described, the combination of a U-shaped uni-planar temperature responsive element, a single support for said element, said support being attached to one leg of said element at a point remote from the bridge part of said element, indicating means driven by the other leg of said element, an actuating coil for heating one of said legs, and a voltage variation balancing coil for heating the other of said legs.

2. In a device of the class described, the combination of a first U-shaped uni-planar temperature responsive element, a pointer shaft mounted on a first leg of said element, a second U-shaped uni-planar temperature responsive element, a driving member mounted on a first leg of said second element, a pointer carried by said shaft and actuated by said driving member, a coil for heating each leg of said second element, a coil for heating one leg of said first element, and means for supporting said elements by the second legs thereof, said supporting means being attached to said second legs at points remote from the bridges of said elements.

3. In an indicator of the class described, the combination of a support, a U-shaped uni-planar temperature responsive element having a first leg attached to said support at a point remote from the bridge of said element, a second U-shaped uni-planar temperature responsive element having a first of its legs attached to said support, said attachments constituting the sole supporting means for said elements, a pointer shaft mounted on the second leg of one of said elements, a pointer carried by said shaft, a pointer driving member mounted on the second leg of the other element, electrical coils for heating both legs of one of said elements, and an electrical coil for heating one leg of the other element.

4. In an indicator of the class described, the combination of a support, an insulating member mounted on said support, a pair of U-shaped uni-planar temperature responsive elements, each mounted by one of its legs on said insulating member, a pointer shaft carried by the other leg of one of said members at a point substantially opposite the point of its support so that ambient temperature changes have no effect upon the position of said shaft with respect to said support, a pointer carried by said shaft, a driving member carried by the other leg of the other U-shaped element at a point substantially opposite the point of its support so that ambient temperature changes have no effect upon the position of said driving member with respect to said support, and heating means for said U-shaped elements.

5. In an indicator of the class described, the combination of a support, a U-shaped temperature responsive element having legs of the same effective length, a connection between the end of one of said legs and said support, a driving pin connected to the other of said legs, a second U-shaped temperature responsive element having both of its legs of the same effective length, a connection between the free end of one of the legs of the second element and said support, a pointer shaft mounted on the free end of the other leg of the second element, a pointer carried by said shaft, a slotted arm movable with said pointer and engaging said pin, and heating coils for said U-shaped elements.

6. In a device of the class described, the combination of a first U-shaped uni-planar temperature responsive element, a pointer shaft mounted on one leg of said element, a second U-shaped uni-planar temperature responsive element, a driving member mounted on one leg of said second element, a pointer carried by said shaft and actuated by said driving member, a coil for heating one leg of each element, and means for supporting each element by the other leg thereof and at a point remote from the bridge of such element.

7. In an indicator of the class described, the combination of a support, a U-shaped uni-planar temperature responsive element having a first leg attached to said support at a point remote from the bridge of said element, a second U-shaped uni-planar temperature responsive element having a first leg attached to said support, said attachments constituting the sole supports for said elements, a pointer shaft mounted on the second leg of one of said elements, a pointer carried by said shaft, a pointer driving member mounted on the second leg of the other element, and electrical coils for heating said elements.

8. In an indicator of the class described, the combination including, a support, an integral uni-planar U-shaped temperature responsive element having legs of the same effective length, means connecting the end of one of said legs to said support for supporting said element, a driving pin connected to the end of the other of said legs, a second temperature responsive element similar to the first, means connecting the end of one of its legs to said support for supporting said element, a pointer actuating shaft mounted at the end of the other leg of said second element, a slotted arm cooperatively associated with said driving pin for moving said pointer shaft, said arm being so arranged with respect to said pin and second element that when the first element is at a position corresponding to the zero position of the pointer shaft, movement of the second element effects relative movement between the arm and pin without driving the pin.

9. In an indicator of the class described, the combination including, a support, an integral uni-planar U-shaped temperature responsive element having legs of the same effective length, means connecting the end of one of said legs to said support for supporting said element, a driving pin connected to the end of the other of said legs, a second temperature responsive element similar to the first, means connecting the end of one of its legs to said support for supporting said element, a pointer actuating shaft mounted at the end of the other leg of said second element, a slotted arm cooperatively associated with said driving pin for moving said pointer shaft, a source of variable voltage, a heating coil surrounding the other of said legs of the first element in circuit with said voltage source, a variable condition responsive resistance in circuit with said source and said coil, a heating coil surrounding the other of said legs of the first element, a resistance connected in series with said last mentioned coil across said voltage source, the two circuits, each of which comprises a coil and resistance means, having the same total resistance when the condition responsive resistance is at a minimum position whereby the same current flows through both heating coils to exert identical heating effects upon the legs of the temperature responsive element and the driving pin remains stationary, a heating coil associated with the other leg of said second element and connected across said voltage source, said slotted arm being so arranged with respect to said pin and the other leg of the second element that movement of the second element in response to voltage variations effects no movement of the driving pin when the latter is at its minimum position, and that movement of the other leg of the second elements effects an increasing compensatory action in response to voltage variations when the driving pin is actuated further from its minimum position by the other leg of the first element.

10. In an indicator of the class described, the combination including, a support, an integral uni-planar U-shaped temperature responsive element having legs of the same effective length, means connecting the end of one of said legs to said support for supporting said element, a driving pin connected to the end of the other of said legs, a second temperature responsive element similar to the first, means connecting the end of one of its legs to said support for supporting said element, a pointer actuating shaft mounted at the end of the other leg of said second element, a slotted arm cooperatively associated with said driving pin for moving said pointer shaft, a variable voltage source and heating elements in circuit with said source for effecting movement of said temperature responsive elements, said arm being so arranged with respect to said pin and second element that the second element compensates for the effect of varying voltages upon said driving pin by the first element.

11. In an indicator of the class described, the combination including, a support, an integral uni-planar U-shaped temperature responsive element having legs of the same effective length, means connecting the end of one of said legs to said support for supporting said element, a driving pin connected to the end of the other of said legs, a second responsive element similar to the first, means connecting the end of one of its legs to said support for supporting said element, a pointer actuating shaft mounted at the end of the other leg of said second element, a slotted arm cooperatively associated with said driving pin for moving said shaft, a heating coil surrounding the other leg of said first element and a condition responsive variable resistance in series therewith, a variable voltage source for said resistance and heating coil, and a heating coil surrounding the other leg of the second element connected across said variable voltage source, said arm being so arranged with respect to said pin and second element that the second element compensates for the effect of voltage variations upon the movement of the driving pin by said heating coil on the first element.

12. In an ohmmeter of the class described, a pointer movable between minimum and maximum positions, a temperature responsive element for actuating said pointer, a pin carried by said element, said pointer including slotted means receiving said pin, electrical heating means for said element, means for connecting said heating means with a source of variable voltage, and means for compensating for voltage variation comprising a second temperature responsive element, a second electrical heating means therefor, and a pointer-carrying bracket mounted on and movable under the influence of said second temperature responsive element, said slotted means including a slot extending in the direction of movement of said bracket only when the pointer is in minimum position, whereby movement produced by said last named means causes no rotative movement of said pointer when the latter is in minimum position but produces rotating movement of said pointer when the latter is in any other position.

13. In an indicator of the class described, a pointer movable between minimum and maximum positions, a pin and slot connection for driving said pointer, electrical heating means connected to said pin for driving said pointer, said electrical heating means being affected by variations in voltage impressed upon it, a bracket supporting said pointer, and voltage compensating means supporting and moving said bracket in response to voltage variations, said slot extending in the direction of movement of said bracket only when said pointer is in minimum position, whereby said voltage compensating means creates no rotative movement of said pointer when the latter is in minimum position.

14. In an indicator of the class described, a thermally responsive actuating system comprising two heat responsive elements, an associated electrical heating means for each of said elements, a pointer-carrying bracket mounted on one of said elements, a pointer rotatably supported in said bracket, a pin and slot connection between said pointer and the other of said elements, said pointer being movable over a given range, and means for connecting said heat responsive elements to a source of variable voltage, said slot extending in the direction of movement of said bracket only when said pointer is at one extremity of its movement, whereby movement of said bracket in response to voltage variations produces no movement of said pointer when the latter is at said extremity.

15. In an indicator of the class described, a thermally responsive actuating system comprising two heat responsive elements being so arranged that said system is insensible to variations in ambient temperature, indicating means operated by said actuating system, said indicating means having a zero reference position, an associated electrical heating means for each of said elements, means for connecting said heating means with a source of variable voltage, and means including a pin and slot connection between one of said elements and said indicating means, and a supporting bracket for said indicating means carried by said other element for driving said indicating means, said slot extending in the direction of movement of said bracket when said indicating means is in said zero reference position, whereby movement of said bracket produces no rotative movement of said indicating means when the latter is in said position.

HOMER F. MALONE.